US009533327B2

(12) United States Patent
Maeda

(10) Patent No.: US 9,533,327 B2
(45) Date of Patent: Jan. 3, 2017

(54) TRANSPARENT RESIN PLATE AND A METHOD FOR PRODUCING THE SAME

(75) Inventor: Sadao Maeda, Mihara (JP)

(73) Assignee: KABUSHIKI KAISHA RENIASU (JP)

( * ) Notice: Subject to any disclaimer, the term of this patent is extended or adjusted under 35 U.S.C. 154(b) by 1476 days.

(21) Appl. No.: 12/311,997

(22) PCT Filed: Dec. 10, 2008

(86) PCT No.: PCT/JP2008/072386

§ 371 (c)(1), (2), (4) Date: Apr. 22, 2009

(87) PCT Pub. No.: WO2009/110152

PCT Pub. Date: Sep. 11, 2009

(65) Prior Publication Data

US 2010/0304133 A1 Dec. 2, 2010

(30) Foreign Application Priority Data

Mar. 4, 2008 (JP) ................................ 2008-053412

(51) Int. Cl.

*B32B 27/06* (2006.01)
*B05D 3/06* (2006.01)
*B05D 7/04* (2006.01)
*B05D 7/00* (2006.01)

(52) U.S. Cl.

CPC . *B05D 7/04* (2013.01); *B05D 7/53* (2013.01); *B05D 3/067* (2013.01); *Y10T 428/269* (2015.01)

(58) Field of Classification Search

None

See application file for complete search history.

(56) References Cited

U.S. PATENT DOCUMENTS

| | | | | |
|---|---|---|---|---|
| 3,892,575 | A * | 7/1975 | Watts et al. | 430/532 |
| 6,566,278 | B1 * | 5/2003 | Harvey et al. | 438/778 |
| 2008/0062357 | A1 * | 3/2008 | Suzuki | 349/96 |

FOREIGN PATENT DOCUMENTS

| | | | |
|---|---|---|---|
| JP | 8-238683 | 9/1996 | |
| JP | 9-47722 | 2/1997 | |
| JP | 10-249271 | 9/1998 | |
| JP | 10249271 A * | 9/1998 | B05D 5/00 |

(Continued)

OTHER PUBLICATIONS

English Language Machine Translation of JP 10249271 A (Sep. 1998).*

(Continued)

*Primary Examiner* — Kenneth Stachel

(74) *Attorney, Agent, or Firm* — Merek, Blackmon & Voorhees, LLC

(57) ABSTRACT

A transparent resin plate superior in quality and productivity and a method for producing the same by forming a hard-coat layer on a substrate into a hardened film and by establishing a reforming method thereof are disclosed. The transparent resin plate has a substrate (1), a primer layer (2) and a hard-coating layer (3) in order, wherein the primer layer (2) is formed by a wet method, the hard-coating layer (3) is formed out of silicone polymer by the wet method, the surface of the silicone polymer layer is exposed to irradiation by ultraviolet light having a wavelength less than 200 nm, and only the exposed region is changed into a reformed region mainly composed of silicon dioxide.

15 Claims, 8 Drawing Sheets

(56) References Cited

FOREIGN PATENT DOCUMENTS

| | | | | | |
|---|---|---|---|---|---|
| JP | 2001-232728 | A | | 8/2001 | |
| JP | 2002-187738 | A | | 7/2002 | |
| JP | 2002187738 | A | * | 7/2002 | ............. C03C 17/25 |
| JP | 2004123816 | A | * | 4/2004 | ................ C08J 7/00 |
| JP | 2004-272049 | A | | 9/2004 | |
| JP | 2006-122748 | A | | 5/2006 | |
| JP | 2007-31565 | A | | 2/2007 | |

OTHER PUBLICATIONS

English Language Machine Translation JP 2002187738 A (Jul. 2002).*

English Language Machine Translation JP 2004123816 A (Apr. 2004).*

Definition of Silica from Hawleys Condensed Chemical Dictionary, 14th Ed John Wiley & Sons, Inc (2002).*

* cited by examiner (a thickness of 0.3 μ m)

(a thickness of 0.6 μ m)

(a thickness of 1 μ m)

(a thickness of 2 μ m)

TRANSPARENT RESIN PLATE AND A METHOD FOR PRODUCING THE SAME

CROSS-REFERENCE TO RELATED APPLICATION

The present application claims the priority under 35 U.S.C. 119 of Japanese Patent Application No. 2008-053412, filed Mar. 4, 2008, which is hereby incorporated herein by reference in its entirety.

FIELD OF THE INVENTION

This invention relates to a transparent resin plate and a method for producing the same, which is usable for transparent materials or lighting materials such as a window, a wall and a roof.

PRIOR ART

A polycarbonate substrate has been used as a substrate for radioscopy or lighting. Although the polycarbonate substrate is lightweight and superior in formability, its surface is easily damaged as compared with a glass substrate. To improve the abrasion resistance of the surface, a hardened film called a "hard coat" is formed on the polycarbonate substrate.

A hard-coat layer comprises the hardened film formed by laminating acrylic resin or silicon resin on the surface of the polycarbonate substrate.

For methods for enhancing the hardness or abrasion resistance of the hard-coat layer, many prior art methods have been known. For example, Patent literature 1 cited hereinafter mentions a method for optimizing hardening conditions and compositions of a coating liquid, and Patent literature 2 mentions a method for dispersing hard particles into a coating film. In addition, Patent literature 3 mentions a method for forming a film of silicon dioxide and the like by a dry process such as Chemical Vapor Deposition. Furthermore, Patent literature 4 mentions a method for reforming solid compound film having Si—O—Si bonds by vacuum ultraviolet light.

The method of Patent literature 1 is restricted in view of the fact that it is impossible to dry at a hardening temperature of the resin substrate higher than a softening temperature thereof. For example, even in a silicon hard coat, it is impossible to obtain compositions and structure of complete silicon dioxide. Accordingly, there is a problem that the hardness deteriorates if solvent components merely remain in the structure. That is, because the hardening temperature is an important factor in determining the hardness of the film, only a low hardness is obtained in wet coating methods for enhancing the surface hardness of the resin substrate.

On the other hand, the method of Patent literature 2, namely, the method for enhancing the hardness of the whole film by dispersing the hard particles, is available to resolve the problem in Patent literature 1. However, another problem is caused by dispersing the particles. For example, light is dispersed on the surfaces of the particles according to the difference between the refraction index of the particles and that of the film materials, so that a haze is enhanced and the transparency is lost.

The method of Patent literature 3 has been proposed to settle all the above-mentioned problems. According to Chemical Vapor Deposition, which is carried out during decompression, a fine coating film having a uniform composition and a uniform thickness can be provided without heating the resin substrate. This method is called a dry coating method for a wet coating method, having the advantage of the formation of a silicon dioxide film including no impurities. In this case, a hardness very near to the property of a bulk can be obtained. However, in this method, because the film is formed by a chemical reaction, unnecessary reaction products are generated on electrodes or device surfaces other than the substrate surface. Accordingly, this method has a problem that the device performance and the film property are apt to be unstable. Besides, to avoid this problem, it is necessary to stop the device and clean the inside. Accordingly, the operating time of the device is shortened. Further, in Chemical Vapor Deposition (CVD), when the film is selectively formed on a required region, a step of a film thickness is formed at the edge. In this case, micro cracks occur develop from the edge due to stress concentration.

According to the method of Patent literature 4, a solid compound film applicable to a resist for $F_2$ laser lithography is provided. A fine pattern is formed on a solid compound film including Si—O—Si bonds or a silicon oxide film. According to this method, the solid compound film including Si—O—Si bonds is reformed into silicon dioxide. However, Patent literature 4 does not mention at all application to resin glass such as a window or a spectacle lens, each having large area.

Patent literature 1: Japanese Patent Laid Open Publication No. 2001-232728

Patent literature 2: Japanese Patent Laid Open Publication No. 8-238683

Patent literature 3: Japanese Patent Laid Open Publication No. 2007-156342

Patent literature 4: Japanese Patent No. 3950967

SUMMARY OF THE INVENTION

Problems to be Solved by the Invention

It is an object of the invention to provide a transparent resin plate superior in quality and productivity and a method for producing the same by establishing a method for hardening film in the hard-coat layer formed on the substrate and a method for reforming it.

Means to Solve the Problem

In the present invention, a transparent resin plate is a plate whose resin substrate is covered with a hard-coat layer. A method for producing the transparent resin plate of the invention is characterized by a step for forming a hard-coat layer out of silicone polymer by a wet method, and a step for exposing the surface of the hard-coat layer to irradiation by ultraviolet light having a wavelength less than 200 nm and selectively reforming only the exposed region into a hardened film having a thickness under 0.6 μm. Here, the hardened film is thinner than the hard-coat layer.

Further, the transparent resin plate of the invention has the hard-coat layer to cover a polycarbonate substrate. The hard-coat layer comprises silicone polymer, being characterized in that a part of the surface comprises a hardened film having a thickness under 0.6 μm mainly composed of silicon dioxide and forms a flat surface with its circumferential silicone polymer.

Energy of shorter wavelength, light having a wavelength less than 200 nm, has force enough to cut bonds of an organic high polymer and destroy a chemical structure. This is called photo cleavage, and is utilized in the invention.

That is, by appropriately selecting various conditions such as laser strength, pulse duration, pulse interval and so on, C—H, Si—C and Si—O—Si bonds composing side-chain functional groups of the hard-coat layer are selectively cut in order, and then, the cleaved oxygen atoms and silicon atoms are recombined to reform a part of the hard-coat layer into the hardened film mainly composed of silicon dioxide.

Effects of the Invention

According to the invention, a part of the hard-coat layer is reformed into the hardened film mainly composed of silicon dioxide such as glass. Accordingly, the transparent resin plate is superior in abrasion resistance and durability, and has a chemically stable surface superior in transmissivity and flatness. In this case, because the circumference of the hardened film is guarded by unreformed silicone polymer, cracks are prevented from occurring from the end portion as much as possible.

BRIEF DESCRIPTION OF THE DRAWINGS

FIG. 2 is a spectral atlas of FT-IR showing the relation between wave numbers and the transmittance of the transparent resin plate. $F_2$ laser light is irradiated, respectively, on the unreformed siloxane resin layer and the reformed film region, which are formed on the polycarbonate substrate.

FIG. 3 is a microphotograph of the surface of the transparent resin plate. The Taber Friction Test is carried out on the unreformed siloxane resin layer and the reformed hard-coat layer in accordance with JISK7204.

FIG. 4 comprises comparative-photographic views of film thicknesses of the transparent resin plate.

PREFERRED EMBODIMENT OF THE INVENTION

Figure 1:
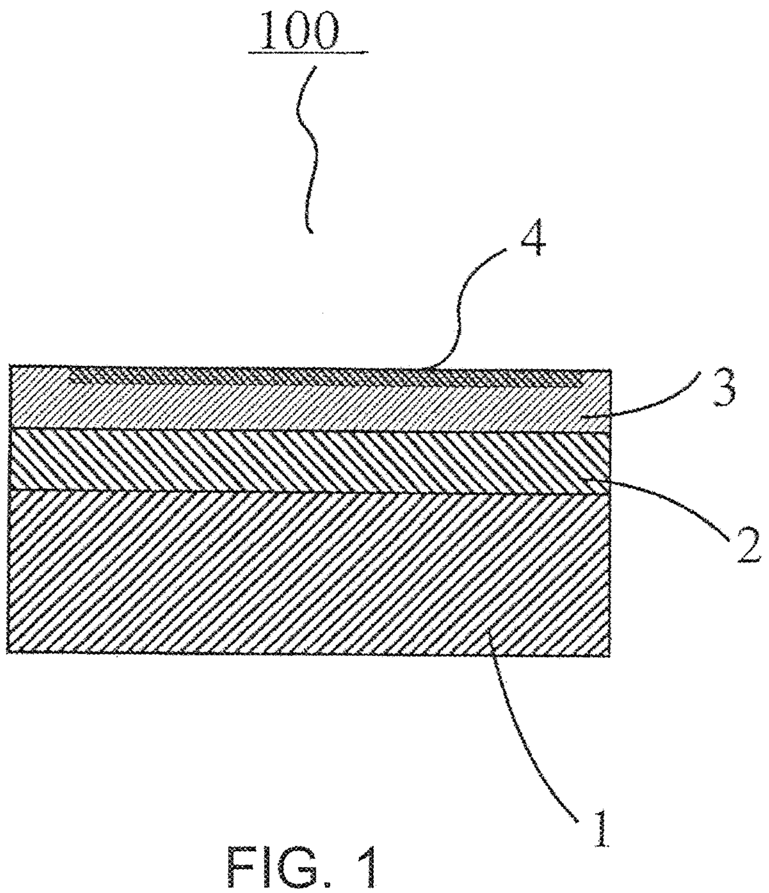
FIG. 1 is a schematic view of a section of the transparent resin plate.

A silicon dioxide film is preferably made thick to enhance abrasion resistance. In Patent literature 4, the past examples merely illustrate that reforming into the silicon dioxide can be carried out. Besides, as to thickness, they illustrate a possibility for making a reformed region having a thickness of more than 1 μm.

In advancing the invention, the inventors formed a hard-coat layer on the surface of the resin substrate having an area of about 1 $cm^2$, and confirmed that the hard-coat layer was reformed into silicon dioxide by vacuum ultraviolet rays.

To investigate whether cracks occur on the finished silicon dioxide, the resin substrate was dipped into solvent (acetone) which can dissolve the resin. However, a solution of the resin could not be observed at the portion where the silicon dioxide film was formed. This indicates that no cracks occur on the silicon dioxide film, because the solvent would penetrate from a crack.

The inventors further formed the hard-coat film and made an area of 1 $cm^2$ thereof a reformed region having a thickness of 1 μm or 2 μm. Then, a friction test was carried out in accordance with Taber Friction Test. The Taber Friction Test is a test wherein a specimen is fitted and rotated on a rotating disk and worn by loading on a pair of grindstones. For example, according to Japanese Industrial Standards Committee (JISC), JISK7204 is standardized as one Taber Friction Test. As a result, when the cracks occurred in the hard-coat film of the unreformed region during the Friction Test, all of them spread to the reformed region and caused new cracks. The load was 500 g, and the number of rotation was 500.

In reforming the Si—O—Si bonds into silicon dioxide ($SiO_2$) by exposure to a light source of less than 200 nm, oxygen in a reaction atmosphere or oxygen in silicon polymer is incorporated into the reformed region. It is believed that the volume of the reformed region is changed, and internal stress is kept in the reformed region itself when oxygen is incorporated into the reformed region. Further, it is believed that internal stress is released and cracks occur on the reformed region when cracks occur on the hard-coat layer in the Taber Friction Test.

Then, samples in which each film thickness of the reformed region of silicon dioxide was under 1 μm were prepared and investigated. As a result, it was found out that cracks did not occur in the Taber Friction Test when the film thickness was less than 0.6 μm.

From the above investigation, in reforming into silicon dioxide, the film thickness should be made less than 0.6 μm, for example, 0.5 μm. If the reformed region has a film thickness larger than this, strength can not be enhanced. Adversely, cracks occur from the inside during use. Accordingly, controlling the film thickness of the reformed region becomes an important problem.

As a light source of vacuum ultraviolet rays having a wavelength shorter than 200 nm, an excimer laser, an excimer lamp, and a low pressure mercury lamp are examples. The usable excimer lasers are an $Ar_2$ laser having a wavelength of 126 nm, an $F_2$ laser having a wavelength of 157 nm, an ArF excimer laser having a wavelength of 193 nm, a KrF excimer laser having a wavelength of 248 nm, and/or an XeCl excimer laser having a wavelength of 307 nm. In these, the light sources of vacuum ultraviolet rays having a wavelength shorter than 200 nm are an $Ar_2$ laser, an $F_2$ laser and an ArF laser. Besides, the usable excimer lamps are ones having a wavelength of 126 nm ($Ar_2$), 146 nm ($Kr_2$), and 172 nm ($Xe_2$).

Theoretically, synthetic quartz glass has light permeability to vacuum ultraviolet rays having a wavelength region of about 145 nm. As to the excimer laser and the excimer lamp each having a wavelength shorter than this, absorption for the silicon dioxide reformed by the vacuum ultraviolet rays occurs. Accordingly, with these light sources, because the light does not reach the interior, it is possible to reform an extremely thin region of the exposed surface in the hard-coat layer, but it is difficult to control the thickness of the reformed region.

Because oxygen absorbs the vacuum ultraviolet rays, the distance from the light source of the excimer lamp available for a wavelength region of 172 nm to its exposed field is very short less than 3 mm. Therefore, the excimer lamp is available for a plane transparent plate, but unavailable for a three-dimensional transparent plate, such as the windshield of a car. An excimer laser easily controllable as to light strength is available for the three-dimensional transparent plate by controlling the light strength in accordance with the distance to the transparent plate.

Further, even in light sources of 145 nm-200 nm, the cause of problems in the adhesive property of the hard-coat layer for the polycarbonate were found. The cause was that the vacuum ultraviolet rays permeated the hard-coat layer and invaded the primer layer. According to FIG. 8, a silicon polymer such as siloxane resin has good transmissivity in a long-wavelength region of about 200 nm, but the transmissivity radically decreases in a region from about 180 nm to a short-wavelength. Vacuum ultraviolet rays having a wavelength shorter than 200 nm have an ability to decompose even the polycarbonate substrate used in the invention. Accordingly, it is believed that the primer layer is decomposed, so as to peel easily.

According to the above-mentioned investigation, when the excimer laser is used as a light source, it is preferable to use an F2 laser having a wavelength of 157 nm. Light of this wavelength does not permeate the siloxane resin. Accordingly, when the excimer laser is irradiated on the siloxane resin, the surface receives high energy and starts to be reformed into silicon dioxide. The laser light permeating the reformed siloxane resin continues reforming sequentially from the surface to the inside.

When an excimer lamp is used, it is preferable to use an Xe excimer lamp. The Xe excimer lamp has a wavelength of 172 nm, which permeates the hard-coat layer. The permeating light reaches and decomposes the polycarbonate substrate. Besides, the vacuum ultraviolet rays permeate the hard-coat layer with high energy, and therefore, it is difficult to control the thickness of the reformed region. To solve this problem, an ultraviolet absorbent is added to the hard-coat layer. In this case, the ultraviolet absorbent is dispersed in accordance with the film thickness of the hard-coat layer so that the light does not permeate the hard-coat layer. The hard-coat layer including the ultraviolet absorbent absorbs the light energy from the surface side thereof, so that it is reformed. The hard-coat layer changes into silicon dioxide by the reformation. Therefore, the transmissivity increases, so that the light having high energy can penetrate inwardly further. As a result, it is possible to control the film thickness of the reformed region reformed into silicon dioxide from the surface of the hard-coat layer.

FIG. 1 is a schematic view of a section of the transparent resin plate.

A transparent resin plate 100 comprises a substrate 1, a primer layer 2 and a hard-coat layer 3. The hard-coat layer 3 is formed on the substrate 1 through the primer layer 2. The primer layer 2 and the hard-coat layer 3 are respectively formed by the dip coating method. On the other hand, a part of the surface of the hard-coating layer 3 is formed into a reformed region (a hardened film) 4.

The construction of the transparent resin plate 100 will be explained below.

The substrate 1 is specifically not limited. However, for materials, it is preferable to use various olefin resins or transparent resins such as acrylic resin, polycarbonate resin, polyacrylate resin, polystyrene resin, polyethylene terephthalate resin, styrene polymer and so on.

The primer layer 2 is provided in order to enhance the shock resistance or the adherence between the substrate 1 and the hard-coat layer 3. Besides, in the invention, it has the effect of removing flaws on the surface of the substrate 1. The primer layer 2 is formed out of various resins such as polyester resin, acrylic resin, polyurethane resin, epoxy resin, melamine resin, polyolefin resin, urethane acrylate resin and so on.

The hard-coat layer 3 is formed out of silicone polymer, namely, siloxane resin. Generally, this siloxane resin is obtained by hydrolyzing siloxane sol, and this siloxane sol is obtained by an alkoxysilane-based condensing reaction.

The reformed region 4 is formed by reforming a part of the surface of the hard-coat layer by laser light irradiation, the reformed region comprising a thin film mainly composed of silicon dioxide.

Next, a method for producing a transparent resin plate related to the invention will be explained. The primer layer 2 having a predetermined thickness is formed on the resin substrate 1 by a wet method, for example, the dip coating method. The substrate 1 is dried at a room temperature for a required time. Thereafter, it is hard-dried in the atmosphere for a required time by heating. After the temperature of the substrate 1 returns to room temperature, the hard-coat layer 3 having the fixed thickness is similarly formed on the primer layer 2 by a wet method, namely, the dip coating method. After the hard-coat layer 3 is dried at the room temperature for a required time, it is hard-dried in the atmosphere for a required time by heating. The hard-drying temperature and the necessary time can be appropriately converted for the kinds of materials and the film thicknesses.

Then, the surface of the hard-coat layer 3 is exposed to irradiation of the ultraviolet laser light having a wavelength less than 200 nm so as not to cause ablation. Here, the components of the exposed region are reformed to form the reformed region.

EXAMPLES

To further illustrate the transparent resin plate and the method for producing the same of the invention, the following examples are given. However, these examples are intended to illustrate the invention and not to be construed to limit the scope of the invention.

Example 1

This embodiment is an example wherein the polycarbonate substrate, the acrylic primer layer and the silicone hard-coat layer were applied as materials of the transparent resin plate 100. The transparent resin plate 100 was produced as follows. Thereafter, the reformed region 4 of the hard-coat layer 3 was compared with the circumferential unreformed region in the property.

An acrylic resin layer 2 having a film thickness of about 4 μm was formed on a polycarbonate substrate 1 by the dip coating method. Then, the plate was dried at room temperature, and thereafter, hardened by heating in the atmosphere at a temperature of 120° C. for 70 minutes. After the substrate 1 returned to room temperature, the hard-coat layer 3 having a film thickness of about 4 μm was formed on the acrylic resin layer 2 by the dip coating method. The hard-coat layer 3 was formed out of siloxane resin. Then, the plate was dried at room temperature, and thereafter, hard-dried in the atmosphere at a temperature of 120° C. for 60 minutes.

Next, an $F_2$ laser having a wavelength of 157 nm irradiated the surface of the hard-coat layer 3. The irradiated area was about 10 mm×25 mm, the energy density was about 17 $mJ/cm^2$, the pulse frequency was 10 Hz, and the irradiation time was 30 seconds. A reformed region 4 having a thickness of about 0.15 μm was obtained. No particular step-like texture can be observed at the boundary between the reformed region 4 and the unreformed region.

Figure 2A:
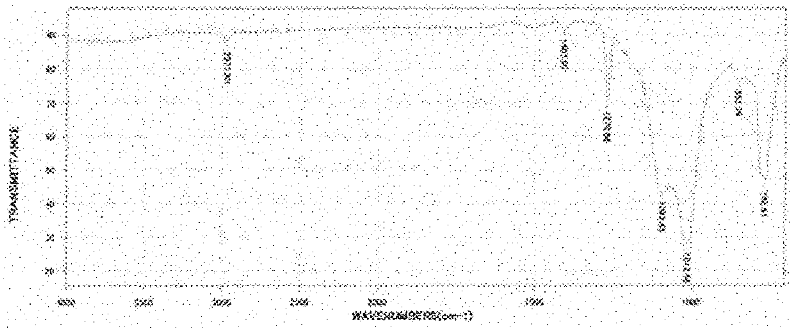
FIG. 2A shows the measured effect on the unreformed region.
Figure 2B:
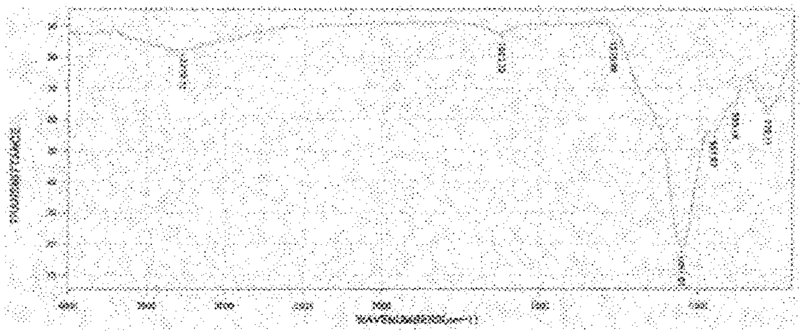
FIG. 2B shows that of the reformed region.
Figure 2C:
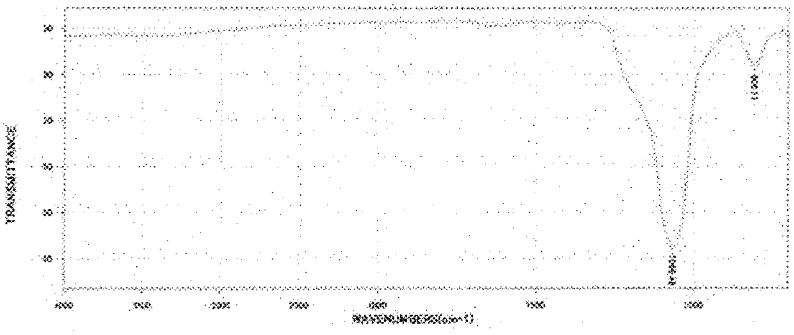
FIG. 2C shows that of thermal silicon dioxide.

FIG. 2 is a spectral atlas of an FT-IR (Fourier Transform Infrared Spectrometer) showing the relation between wave numbers and transmissivity. FIG. 2A shows a measurement of the unreformed region (the hard-coat layer 3). FIG. 2B is the reformed region 4 (the hardened film), and FIG. 2C is thermal silicon oxide. In FIG. 2A, other than the stretching vibration (1200-1000 $cm^{-1}$) of Si—O, deformation vibration (1270 $cm^{-1}$) of Si—$CH_3$, and C—H stretching vibration and Si—C stretching vibration of (765 $cm^{-1}$) which originate in $CH_3$ (2791 $cm^{-1}$) are observed. In contrast, in FIG. 2B, absorption of 2971 $cm^{-1}$, 1270 $cm^{-1}$ or 765 $cm^{-1}$ is weak, and an absorption spectrum like the spectral atlas of FIG. 2C is shown. Accordingly, the reformed region 4 is considered as having a structure closely related to the characteristic of thermal silicon dioxide mainly composed of silicon dioxide.

Figure 3A:
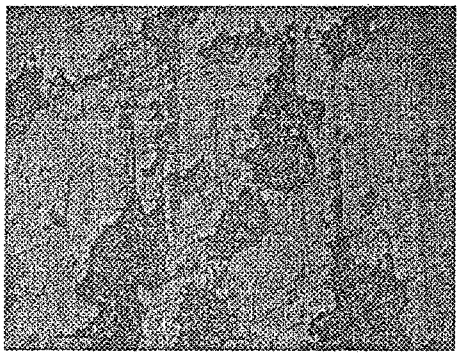
FIG. 3A is a photograph of the unreformed region.
Figure 3B:
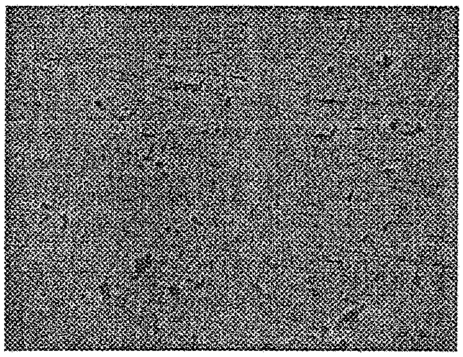
FIG. 3B is that of the reformed region.
Figure 4A:
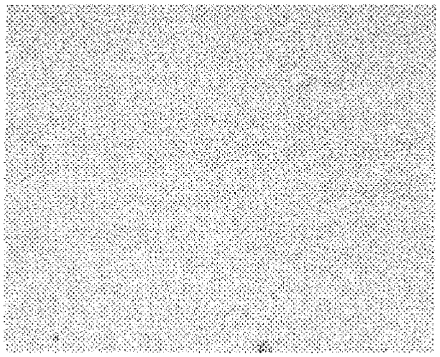
FIG. 4A is a microphotograph of the Taber Friction Test of a surface having a film thickness of 0.3 μm.
Figure 4B:
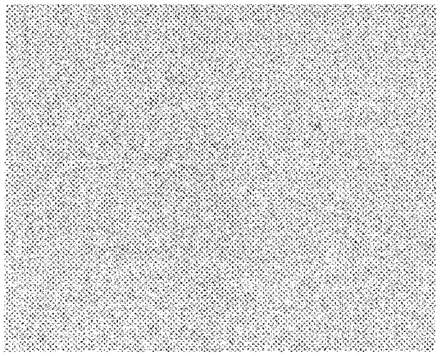
FIG. 4B is that having a film thickness of 0.6 μm.
Figure 4C:
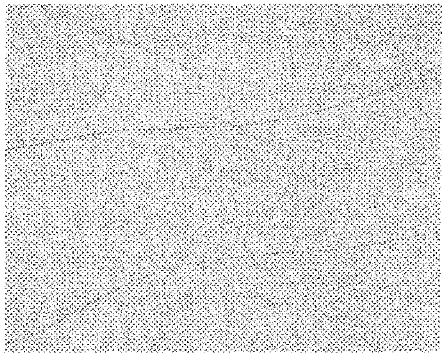
FIG. 4C is that having a film thickness of 1.0 μm.
Figure 4D:
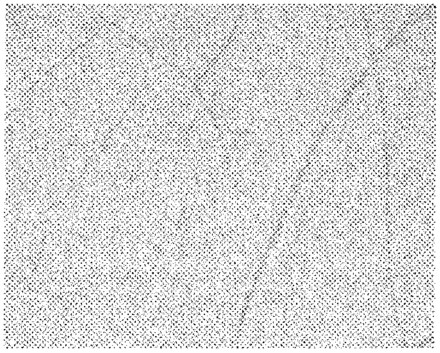
FIG. 4D is that having a film thickness of 2.0 μm.

FIG. 3 comprises microphotographs of the surface of the hard-coat layer 3, showing test results of the Taber Friction Test in accordance with JISK7204. FIG. 3A is a microphotograph of the unreformed region, and FIG. 3B is a microphotograph of the reformed region. In the reformed region and the unreformed siloxane resin layer surface (the hard-coat layer surface), a big difference is observed in flaws by the Friction Test. It is confirmed that the hardness of the reformed region increases.

Although the above-mentioned example explains a method in which the irradiation area was about 10 mm×25 mm, the irradiation area can be enlarged by irradiating the laser while moving an XY-table on which the substrate 1 is arranged. Besides, in the above-mentioned example, the laser reformation required an irradiation time of 30 seconds at a pulse frequency of 10 Hz per unit area. However, the irradiation time can be shortened; for example, it is 3 seconds when the pulse frequency is 100 Hz. When the pulse frequency is 1 KHz, the irradiation time can be shortened to 0.3 seconds.

Reforming time can be shortened by letting the laser output increase in the range where abrasion does not occur.

The vacuum ultraviolet laser ($F_2$) having a wavelength of 157 nm used in the above-mentioned example has an oxygen absorptivity. However, it is possible to suppress the decrement of the laser light, for example, by filling an optical path with nitrogen gas. In this case, vacuuming time is not needed because the operation is not carried out under vacuum like the CVD.

In this embodiment, conditions for hard-drying the siloxane resin layer can be appropriately changed in order to lighten stress or optimize the composition and structure of the reformed region. For example, the hard-drying temperature can be lowered. Besides, the hard-drying may be carried out under appropriate conditions after the reformation not in forming the siloxane resin layer.

FIG. 4 comprises comparison views showing the relation of a thickness of the reformed region 4 and a crack, each figure being a microphotograph of a test result of the Taber Friction Test. The transparent resin plates each having the reformed region 4 of the film thickness of 0.6 μm, 1.0 μm or 2.0 μm were formed the same as in Example 1, except that the thickness of the reformed region 4 was 0.3 μm. The thickness of the acrylic resin layer and the thickness of the silicone polymer layer are both made 4 μm. The test result is according to the Taber Friction Test in accordance with JISK7204. From the figure, it is confirmed that a crack does not occur when the thickness of the reformed region is 0.3 μm, and that a crack occurs when the thickness is more than 0.6 μm. Besides, the larger the film thickness, the more the density of the cracks increases. It is surmised that the cracks occur because the reforming region 4 has compressive stress due to volume expansion, because oxygen incorporated by the laser reformation forms silicon dioxide. If the thickness of the reformed region is more than 0.6 μm, the cracks occur irrespective of the size of the transparent glass substrate. The film thickness is controlled to less than 0.6 μm by appropriately choosing formation conditions of the hard-coat layer 3, namely, the laser light strength, the irradiation time, the pulse duration and the frequency, so as not to cause cracks.

Example 2

Figure 5:
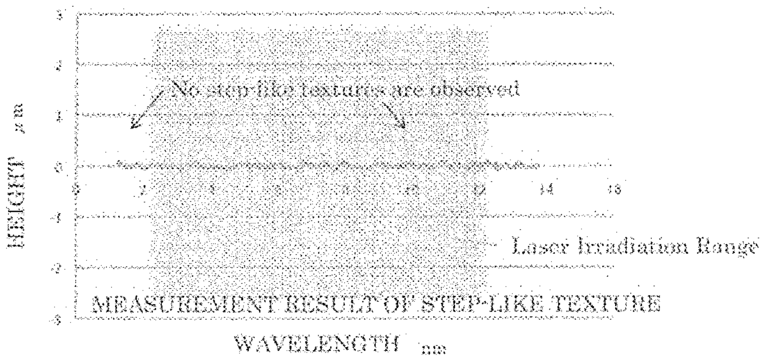
FIG. 5 is a view showing the absence of any particular step-like texture between the reformed region and the unreformed region of the transparent resin plate.

The transparent resin plate was formed the same as in Example 1 except that the laser irradiated an area where a wiper blade rubbed. The polycarbonate substrate 1 with the hard-coat layer 3 was arranged on an XY table and exposed to the irradiation of the laser while moving the XY table. In this case, the motion of the XY table was inputted into a controller in advance, and only the reforming area was deposited by scanning. Since the laser light was equally irradiated on the deposited area, there was no step-like texture observed between the reformed region and the unreformed region. Accordingly, the abrasion resistance for the wiper blade was enhanced (See FIG. 5). Besides, because the internal stress of the reformed region is reduced by controlling the film thickness, even if cracks occur in the unreformed region, another crack caused by them can be prevented from being transmitted from the edge of the reformed region.

Example 3

Figure 6A:
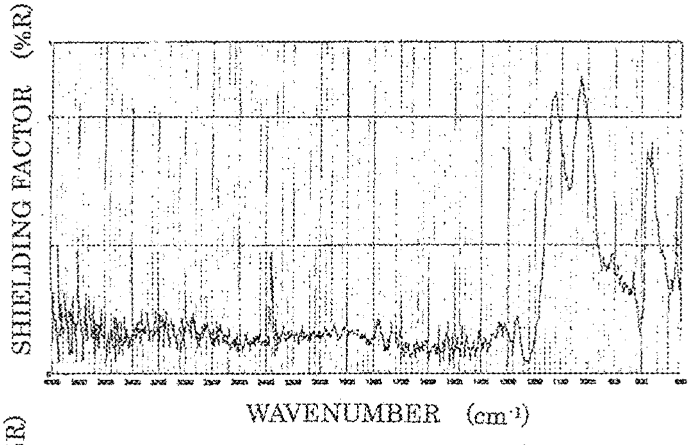
FIG. 6 is a spectral atlas of Examples 3, 4.
Figure 6B:
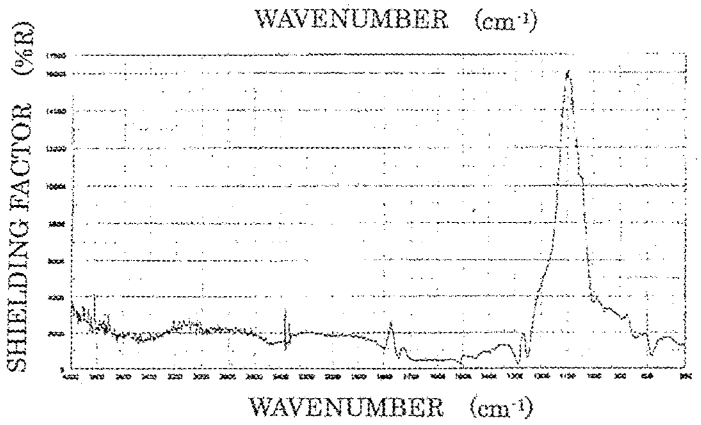

The reformation was carried out in an $N_2$ atmosphere for 180 minutes at a $Kr_2$ excimer lamp output energy strength of 3.2 $mW/cm^2$. The thermosetting primer and the thermosetting hard-coat layer were formed the same as the above-mentioned steps. The reformation into silicon dioxide was confirmed by a surface analysis based on the spectral atlas of FT-IR. A vertical line of the spectral atlas of FT-IR in the above-mentioned examples shows transmissivity, whereas it shows shielding rate in this example. FIG. 6A illustrates an observation result before reforming (after forming the hard-coat layer), and FIG. 6B illustrates an observation result after irradiation by the excimer lamp of 146 nm. As shown in FIG. 6B, a forked Si—O peak is changed into a single peak, and a C—H peak has decreased or disappeared. In this case, the thickness of the reformed region was about 1 μm. In this example, although the film thickness was thickened in order to confirm the reformation into silicon dioxide, the cracks occurred according to the Taber Friction Test in accordance with JISK7204.

If the film thickness of the reformed region is made under 0.5 μm with a $Kr_2$ excimer lamp, about half the irradiation may as well be carried out, but it takes a long time to form the reformed region.

To reform into the silicon dioxide, according to the gas absorption of the resin, oxygen absorbed from the atmosphere is utilized.

Example 4

Figure 6C:
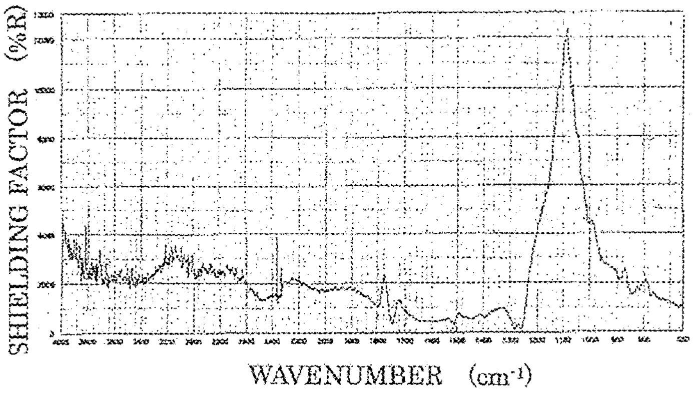

The reformation was carried out with an $Xe_2$ excimer lamp having a wavelength of 172 nm instead of the $Kr_2$ excimer lamp in Example 3. (For oxygen for reforming into silicon dioxide, oxygen absorbed in the resin was utilized.) After forming the thermosetting primer and the thermosetting hard-coat layer, the resin plate was disposed in an $N_2$ atmosphere for 15 minutes at a luminous intensity of 35 $mW/cm^2$. FIG. 6C illustrates the observation result by FT-IR. According to this result, it is confirmed that the reformation into $SiO_2$ was carried out the same as in the case of the irradiation of 146 nm. The thickness of the reformed region was also about 1 μm. Similarly with Example 3, according to the Taber Friction Test in accordance with JISK7204, the cracks occurred.

Figure 7:
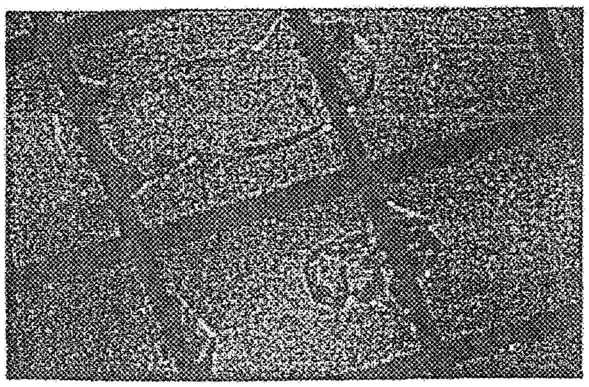
FIG. 7 is a photograph showing peeling.

In addition, an adherence test was carried out on the reformed region in Example 4 in accordance with JISK5400 (JISC standard, a crosscut tape peeling test). Peeling of the hard-coat layer was confirmed. FIG. 7 illustrates the peeling situation. (The black lines are flaws of the crosscut.) The tape peeling test is a test wherein 100 squares of 10 mm×10 mm are made and pressed with a cellophane tape, and thereafter the number of eyes which stay when the cellophane tape is suddenly torn off is counted.

Figure 8:
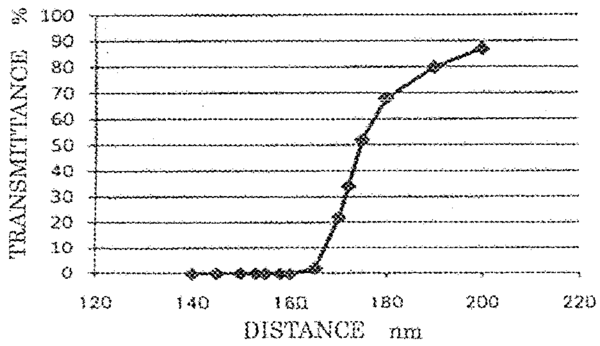
FIG. 8 is a view showing a characteristic of the transmittance in an ultraviolet line region of a simple substance of hard-coat film.

Although the irradiation time was shortened for around 1 minute and the film thickness of the reformed region was thinned in 0.7 μm, the differences were not confirmed in the peeling situation by the test in accordance with JISK5400. It is inferred that the peeling is not caused by reforming the hard-coat film. A hard-coat film of 4 μm was formed on a synthetic quartz glass, and then, the transmissivity of its simple substance in an ultraviolet ray region was measured. The characteristics are shown in FIG. 8, and it was confirmed that the light of 172 nm permeated around 30%. However, in this case, the cracks were not confirmed to occur in the Taber Friction Test in accordance with JISK7204.

Thus, it is considered that the vacuum ultraviolet rays decompose the bedding primer resin layer (acrylic resin) and deteriorate the adhesion property in the boundary of the hard-coat layer and the primer layer.

Next, an appropriate amount of the ultraviolet absorbent was added to a hard-coat liquid in advance, and filming of the hard-coat layer to prevent the reforming ultraviolet rays from permeating was carried out. Then, the reformation was carried out under the same conditions (in $N_2$ atmosphere for 15 minutes at a luminous intensity of 35 $mW/cm^2$) instead of the $Xe_2$ excimer lamp. As a result, peeling of the hard-coat layer was not confirmed in the adherence test in accordance with JISK5400. For an ultraviolet absorbent adaptable to the above-mentioned purpose, a metal oxide such as ZnO, TiO, CaO or SnO is used and desirably doped if necessary. For example, triazine compounds of an organic ultraviolet absorbent can be used. The metal oxides such as ZnO, TiO, CaO and SnO absorb the vacuum ultraviolet rays, to be separated into metal and oxygen, and lose an ultraviolet absorbing ability. Accordingly, the vacuum ultraviolet rays arrive sequentially from the surface of the hard-coat layer at the inside with high energy, then being used for the reformation. In this case, it is believed that some separated oxygen is incorporated as silicon dioxide.

The compound of the hard-coat liquid may be changed for one superior in the shielding property of the wavelength in itself. In this case, the light absorption end of the hard-coat liquid is controlled so as to be higher than the wavelength of the used light source.

Although the excimer laser and the excimer lamp were used in the above-mentioned examples, a low pressure mercury lamp can be also used in the invention as a light source for irradiating vacuum ultraviolet rays. For example, the low pressure mercury lamp of 184.9 nm is usable. When using this lamp, like the excimer lamp of 172 nm, the ultraviolet absorbent is added to the hard-coat layer.

Although the hard-coat layer 3 was formed on the substrate 1 through the primer layer 2 in the above-mentioned examples, it can be directly formed on the substrate 1 out of siloxane resin by the dip coating method so as to cover the substrate 1. In this case also, when utilizing the vacuum ultraviolet rays having a wavelength permeating the hard-coat layer 3, it is desirable to dope the hard-coat layer 3 with a metal oxide such as ZnO, TiO, CaO or SnO. The vacuum ultraviolet rays decompose the resin components of the substrate 1, thereby making worse the adhesion property in the boundary of the substrate 1 and the hard-coat layer 3.

The invention claimed is:

1. A method for producing a transparent plate having a plane shape or a three-dimensional shape in which a resin substrate is covered with a hard-coat layer, comprising:

forming said hard-coat layer out of silicone polymer by a wet method and by heating; and irradiating a region of the hard-coat layer with vacuum ultraviolet rays from an ultraviolet light source, wherein the vacuum ultraviolet rays have a wavelength less than 200 nm, and wherein said region is reformed, by exposure to the irradiation, into a hardened glass film mainly composed of silicon dioxide, said region having a thickness less than 0.6 μm and being thinner than the portion of the hard-coat layer that is other than said region.

2. The method for producing a transparent plate of claim 1, wherein said substrate is a transparent resin substrate.

3. The method for producing a transparent plate of claim 1, wherein a primer layer is formed on said resin substrate by the wet method and thereon the hard-coat layer is formed.

4. The method for producing a transparent plate of claim 1, wherein said silicone polymer comprises siloxane resin.

5. The method for producing a transparent plate of claim 1, wherein an ultraviolet laser is used as the light source.

6. The method for producing a transparent plate of claim 1, wherein an excimer lamp is used as the light source.

7. The method for producing a transparent plate of claim 1, wherein the region is irradiated with an energy density of about 17 $mJ/cm^2$.

8. A transparent plate having a plane shape or a three-dimensional shape comprising:

a hard-coat layer for covering a transparent resin plate having a plane shape or a three-dimensional shape, wherein the hard-coat layer comprises a thermosetting silicone polymer, and a part of a surface of the hard-coat layer comprises a hardened glass film having a film thickness less than 0.6 μm and being mainly composed of silicon dioxide, the hardened glass film forming a flat surface with the part of the silicone polymer that is not the hardened glass film.

9. A method for producing a transparent plate having a plane shape or a three-dimensional shape in which a resin substrate is covered with a hard-coat layer, comprising:

forming said hard-coat layer out of a thermosetting silicone polymer by a wet method, by heating, and by adding ultraviolet absorbents to the silicone polymer; and irradiating a region of the hard-coat layer with vacuum ultraviolet rays from an ultraviolet light source, wherein the vacuum ultraviolet rays have a wavelength less than 200 nm, and wherein said region is reformed, by exposure to the irradiation, into a hardened glass film mainly composed of silicon dioxide, said region having a thickness less than 0.6 μm and being thinner than the portion of the hard-coat layer that is other than said region.

10. The method for producing a transparent plate of claim 9, wherein said substrate is a transparent resin substrate.

11. The method for producing a transparent plate of claim 9, wherein a primer layer is formed on said resin substrate by the wet method and thereon the hard-coat layer is formed.

12. The method for producing a transparent plate of claim 9, wherein said silicone polymer comprises siloxane resin.

13. The method for producing a transparent plate of claim 9, wherein an ultraviolet laser is used as the light source.

14. The method for producing a transparent plate of claim 9, wherein an excimer lamp is used as the light source.

15. The method for producing a transparent plate of claim 9, wherein the vacuum ultraviolet rays have a wavelength no greater than 157 nm.

* * * * *